United States Patent
Chen et al.

(10) Patent No.: US 9,264,914 B2
(45) Date of Patent: Feb. 16, 2016

(54) METHODS FOR MONITORING PAGING MESSAGES WITH REDUCED POWER CONSUMPTION AND COMMUNICATIONS APPARATUSES UTILIZING THE SAME

(75) Inventors: Hung-Yueh Chen, Taipei (TW); Shuang-An Chou, Keelung (TW); Bin-Ruei Wang, Taipei (TW); Wen-Hung Wu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 500 days.

(21) Appl. No.: 12/627,246

(22) Filed: Nov. 30, 2009

(65) Prior Publication Data
US 2011/0130100 A1     Jun. 2, 2011

(51) Int. Cl.
| | |
|---|---|
| *H04W 52/02* | (2009.01) |
| *H04W 24/00* | (2009.01) |
| *H04W 4/06* | (2009.01) |
| *H04W 68/00* | (2009.01) |

(52) U.S. Cl.
CPC .......... *H04W 24/00* (2013.01); *H04W 52/0229* (2013.01); *H04W 4/06* (2013.01); *H04W 68/00* (2013.01); *Y02B 60/50* (2013.01)

(58) Field of Classification Search
CPC ............... Y02B 60/50; H04W 68/005; H04W 52/0235; H04W 52/0225; H04W 68/00; H04W 68/02; H04B 5/04; H04L 1/1685
USPC ............ 455/411, 435.1, 435.2, 574, 515, 434
See application file for complete search history.

(56) References Cited

U.S. PATENT DOCUMENTS

| | | | | |
|---|---|---|---|---|
| 5,978,366 | A  * | 11/1999 | Massingill et al. | 370/337 |
| 6,072,987 | A  * | 6/2000 | Willey | 340/7.43 |
| 6,115,407 | A  * | 9/2000 | Gendel et al. | 375/132 |
| 6,240,288 | B1 * | 5/2001 | Wan et al. | 455/426.1 |
| 2001/0023184 | A1* | 9/2001 | Kalveram et al. | 455/426 |
| 2003/0031140 | A1* | 2/2003 | Oprescu-Surcobe et al. | 370/311 |
| 2004/0224728 | A1* | 11/2004 | Dacosta et al. | 455/574 |
| 2006/0154677 | A1* | 7/2006 | Kim | 455/466 |
| 2008/0084941 | A1* | 4/2008 | Mohanty et al. | 375/260 |
| 2009/0215472 | A1 | 8/2009 | Hsu | |
| 2009/0323624 | A1* | 12/2009 | Kim | 370/329 |
| 2012/0307735 | A1* | 12/2012 | Aghili et al. | 370/328 |

FOREIGN PATENT DOCUMENTS

| | | |
|---|---|---|
| EP | 1 670 274 | 6/2006 |
| EP | 1 804 532 | 7/2009 |

* cited by examiner

*Primary Examiner* — Khai M Nguyen
*Assistant Examiner* — Dung Lam
(74) *Attorney, Agent, or Firm* — McClure, Qualey & Rodack, LLP

(57) ABSTRACT

A method for monitoring paging messages in a mobile station with a subscriber identity card camping on a cell is provided. A paging channel is monitored at every end of predetermined time interval subsequent to the last monitored time. It is detected whether the same identity information is repeatedly broadcasted in the paging channel at different ends of predetermined time interval. A new time interval is determined when detecting that the same identity information is repeatedly broadcasted. The paging channel is monitored at every end of new time interval subsequent to the last monitored time so as to receive subsequent paging messages from the cell, wherein the new time interval is longer than the predetermined time interval.

9 Claims, 8 Drawing Sheets

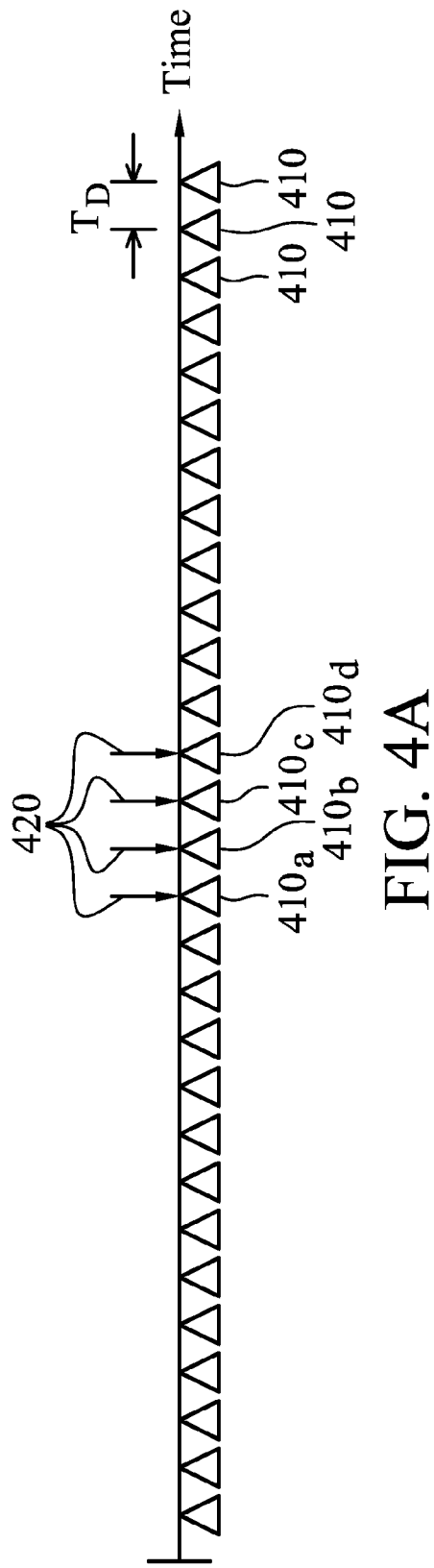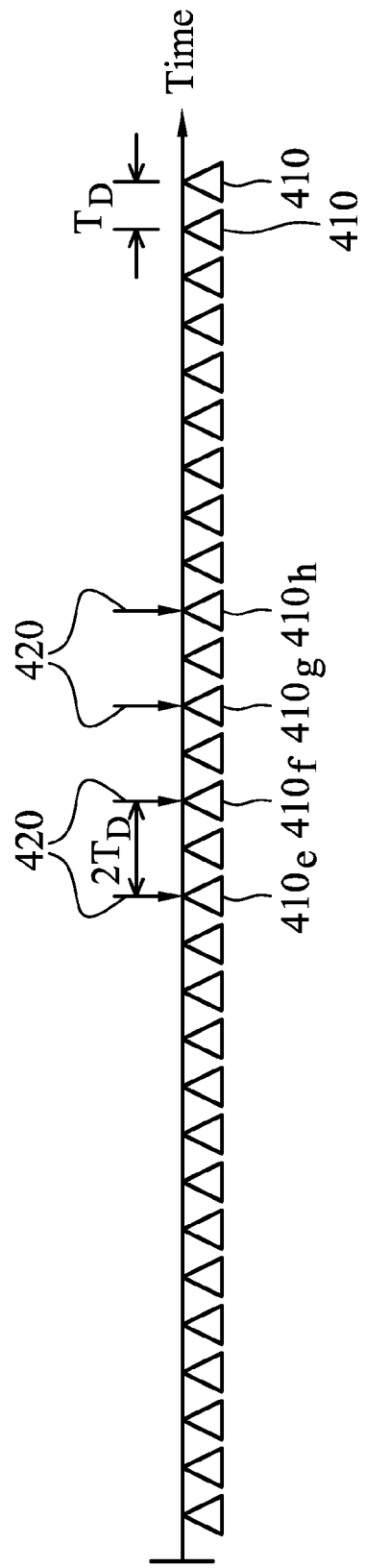

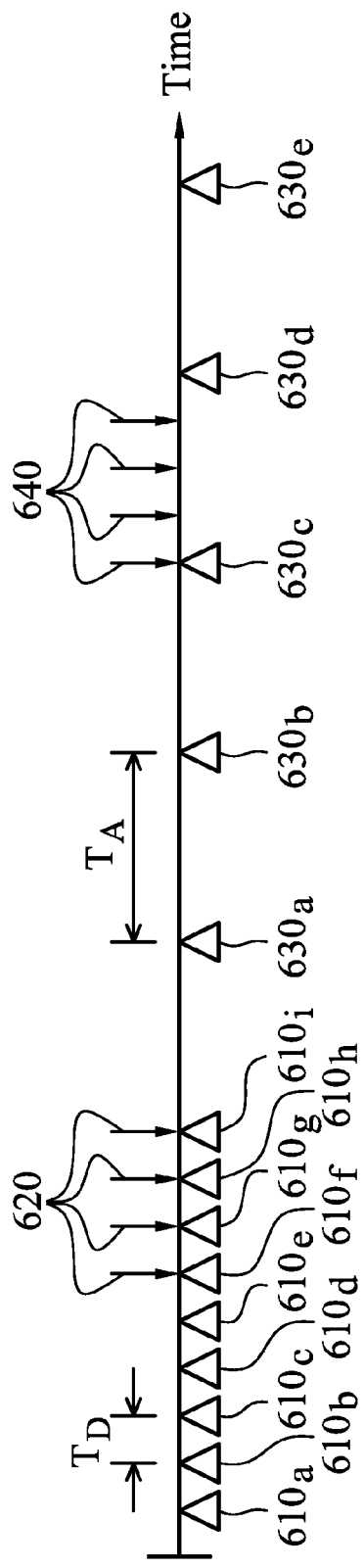
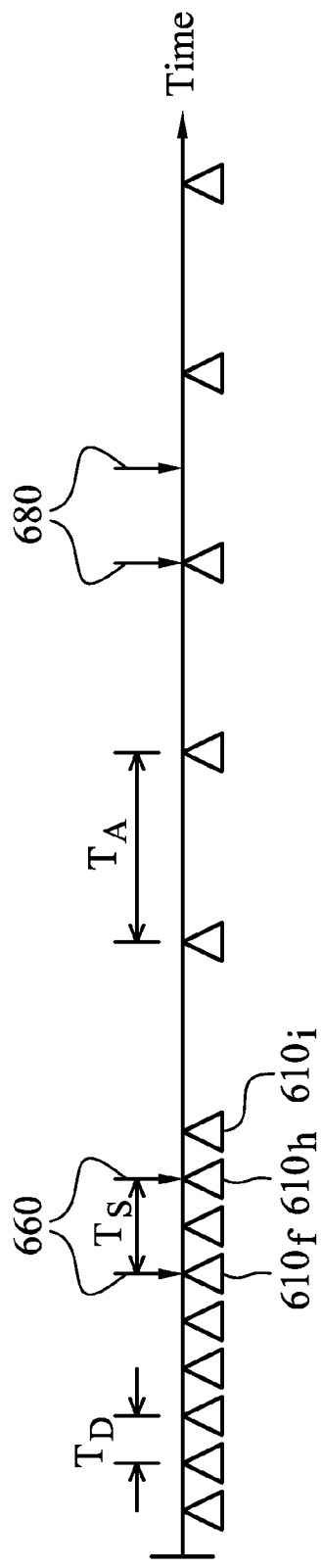
FIG. 6A
FIG. 6B

METHODS FOR MONITORING PAGING MESSAGES WITH REDUCED POWER CONSUMPTION AND COMMUNICATIONS APPARATUSES UTILIZING THE SAME

BACKGROUND OF THE INVENTION

1. Field of the Invention

The present invention is related to a wireless communications apparatus, and more particularly to a wireless communications apparatus for monitoring paging messages with reduced power consumption.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many worldwide locations. They can be used anywhere, as long as there is a cellular telephone site to house equipment that can transmit and receive signals, which are processed to transfer both voice and data to and from the cellular telephones.

There are various well-developed and well-defined cellular communication technologies. As an example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard, which uses code division multiple access (CDMA) technology. The UMTS (Universal Mobile Telecommunications System) is a 3G mobile communications system, which provides an enhanced range of multimedia services over the 2G GSM system. Other emerging radio access technology (RAT), such as Time Division—Synchronous Code Division Multiple Access (TD-SCDMA), Worldwide Interoperability for Microwave Access (WiMAX), long term evolution (LTE), or others, is still developed.

For various cellular communication technologies, listening to paging channels, paging indicator channels or others, in idle mode to obtain paging messages consumes certain amount of battery power and may hinder data transceiving in Packet-switched (PS) domain. Therefore, a method for smart monitoring paging messages in an MS is desired.

BRIEF SUMMARY OF THE INVENTION

Methods for monitoring paging messages with reduced power consumption and communications apparatuses utilizing the same are provided. An embodiment of a method for monitoring paging messages in a mobile station with a subscriber identity card camping on a cell is provided. A paging message from the cell is monitored at every end of predetermined time interval subsequent to the last monitored time. It is detected whether the same identity information is repeatedly broadcasted in the paging channel at different ends of predetermined time interval. A new time interval is determined when detecting that the same identity information is repeatedly broadcasted. The paging channel is monitored at every end of new time interval subsequent to the last monitored time so as to receive subsequent paging messages from the cell, wherein the new time interval is longer than the predetermined time interval.

Furthermore, another embodiment of a method for monitoring paging messages in a mobile station with a subscriber identity card camping on a cell is provided. A smart monitoring procedure is performed to monitor a paging channel at every end of first time interval subsequent to the last monitored time so as to receive a message. The smart monitoring procedure is stopped when a specific condition is satisfied, so as to monitor the paging channel at every end of second time interval subsequent to the last monitored time to receive subsequent messages, wherein the first time interval is a multiple of the second time interval.

Moreover, another embodiment of a method for monitoring paging messages in a mobile station with a subscriber identity card camping on a cell is provided. A paging channel is periodically monitored in a first frequency to receive a plurality of paging messages from the cell and determine whether the cell sent the same paging message for more than one time by different paging messages. It is determined whether communication between the mobile station and the cell is operating in a packet switched domain when determining that the cell sent the same identity information for more than one time by different paging messages. A second frequency is used to monitor the paging channel when the communication between the mobile station and the cell is operating in a packet switched domain, wherein the second frequency is lower than the first frequency.

Furthermore, an exemplary embodiment of a communications apparatus for monitoring paging messages is provided. The communications apparatus comprises a subscriber identity card camping on a cell and a processing module. The processing module monitors a paging channel at every end of predetermined time interval subsequent to the last monitored time and detects whether the same identity information is repeatedly broadcasted in the paging channel at different ends of predetermined time interval. When detecting that the same identity information is repeatedly broadcasted, the processing module determines a new time interval longer than the predetermined time and monitors the paging channel at every end of new time interval subsequent to the last monitored time so as to receive subsequent paging messages from the cell.

Furthermore, another exemplary embodiment of a communications apparatus for monitoring paging messages is provided. The communications apparatus comprises a subscriber identity card camping on a cell and a processing module. The processing module performs a smart monitoring procedure to monitor a paging channel at every end of first time interval subsequent to the last monitored time so as to receive a message, and stops performing the smart monitoring procedure when a specific condition is satisfied, so as to monitor the paging channel at every end of second time interval subsequent to the last monitored time to receive subsequent messages, wherein the first time interval is a multiple of the second time interval.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4A shows a schematic diagram illustrating an exemplary distribution of paging occasions at which a communications apparatus listens to and paging messages broadcasted from a cell served by a first network operator that the communications apparatus has camped on;

FIG. 4B shows a schematic diagram illustrating another exemplary distribution of paging occasions at which the communications apparatus listens to and paging messages broadcasted from a cell served by a second network operator that the communications apparatus has camped on;

FIG. 6A shows a schematic diagram illustrating an exemplary distribution of paging occasions at which the mobile station listens to and paging messages broadcasted from the cell that the mobile station has camped on;

FIG. 6B shows a schematic diagram illustrating another exemplary distribution of paging occasions at which the mobile station listens to and paging messages broadcasted from the cell that the mobile station has camped on;

FIG. 8 shows a schematic diagram illustrating an exemplary distribution of paging occasions of the mobile station at which the mobile station listens to and paging messages broadcasted from the cell that the mobile station has camped on.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figures 1, 2:
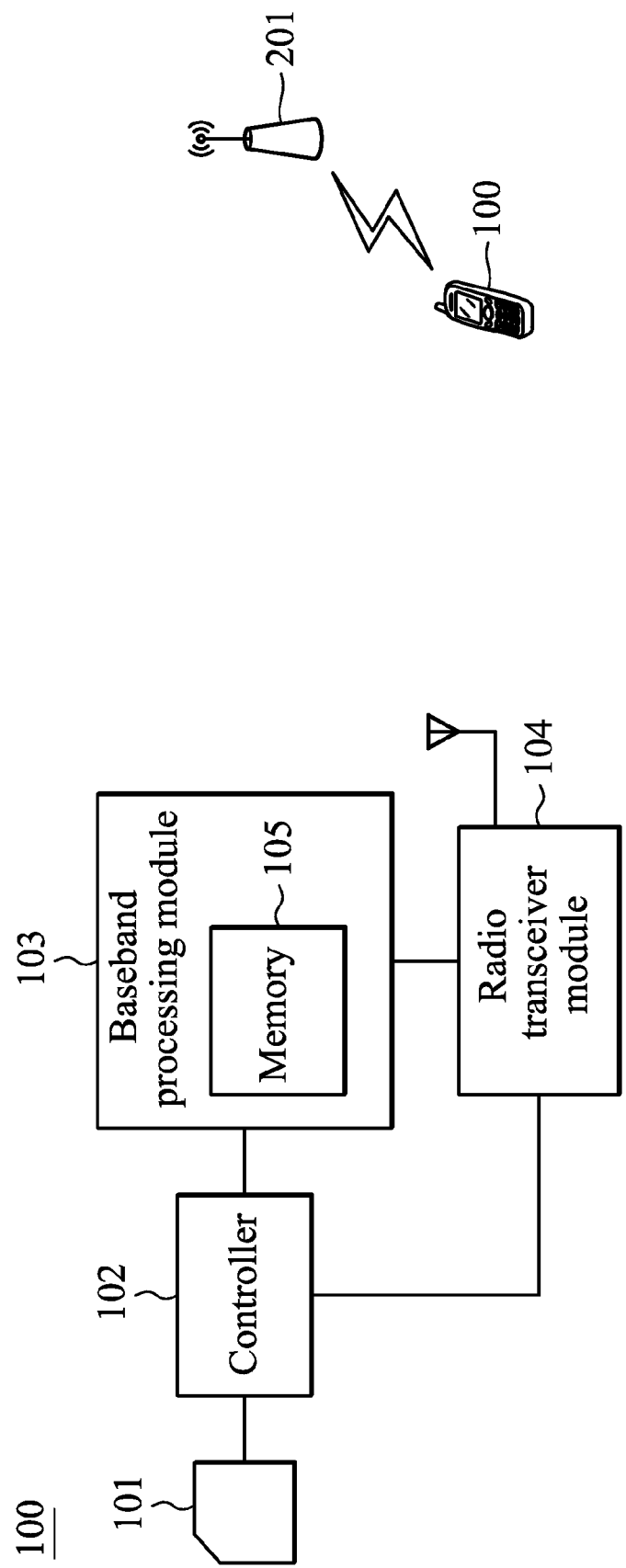
FIG. 1 shows a communications apparatus for monitoring paging messages with reduced power consumption according to an embodiment of the invention.
FIG. 2 shows an exemplary network topology according to an embodiment of the invention.

FIG. 1 shows a communications apparatus 100 for monitoring paging messages with reduced power consumption according to an embodiment of the invention. The communications apparatus 100 comprises a subscriber identity card 101, a controller 102, a baseband processing module 103, and a radio transceiver module 104, wherein the controller 102 is coupled to the radio transceiver module 104, the subscriber identity card 101 and the baseband processing module 103 for controlling the operations thereof. FIG. 2 shows an exemplary network topology according to an embodiment of the invention. The communications apparatus 100 may communicate with a wireless network through a cell belonging to the wireless network, and camp on the cell via the radio transceiver module 104, where the cell may be covered by a Node B 201 (or also known as a Global System for Mobile communications, GSM base station, a Worldwide Interoperability for Microwave Access, WiMAX advanced base station, a long term evolution, LTE enhanced base station, or others), as shown in FIG. 2.

Referring to FIG. 1 and FIG. 2 together, the radio transceiver module 104 receives wireless radio frequency signals from the cell 201 of the wireless network, converts the received signals to baseband signals to be processed by the baseband processing module 103, or receives baseband signals from the baseband processing module 103 and converts the baseband signals to wireless radio frequency signals to be transmitted to a peer device. The radio transceiver module 104 may comprise a plurality of hardware devices to perform radio frequency conversion. For example, the radio transceiver module 104 may comprises a mixer to multiply the baseband signals with a carrier oscillated in the radio frequency of the wireless communication system for transmission, wherein the radio frequency may be, for example, 1900 MHz for a WCDMA system. When the radio transceiver module 104 receives the wireless radio frequency signals from the cell 201 of the wireless network, the mixer recovers the received signal into baseband signals, and the baseband processing module 103 converts the baseband signals to a plurality of digital signals and processes the digital signals. The baseband processing module 103 may also comprise a plurality of hardware devices to perform baseband signal processing. The baseband signal processing procedure may comprise analog to digital conversion (ADC)/digital to analog conversion (DAC), gain adjustment, modulation/demodulation, encoding/decoding, and so on. The subscriber identity card 101 may record a plurality of user information and the controller 102 may read data from the plugged in subscriber identity card 101 and write data thereto. Note that it is also feasible to integrate the controller 102 into the baseband processing module 103.

According to an embodiment of the invention, the subscriber identity card 101 may relate to one kind of wireless communication system. For example, the subscriber identity card 101 may be a subscriber identity module (SIM) card of a Global System for Mobile communication (GSM), a universal subscriber identity module (USIM) card of a Universal Mobile Telecommunications System (UMTS), or a removable user identity module (RUIM) card or a CDMA Subscriber Identity Module (CSIM) card of a CDMA2000 system, or others. For example, the SIM/USIM card stores user account information, international mobile subscriber identity (IMSI), authentication information and a set of SIM/USIM Application Toolkit (SAT/USAT) commands and provides storage space for text messages and phone book contacts. The controller 102 may interact with a MCU of the SIM/USIM card to fetch data or SAT commands from the plugged in SIM/USIM card.

In the communication systems such as the GSM, UMTS, General Packet Radio Service (GPRS), CDMA 2000, Time Division-Synchronous Code Division Multiple Access (TD-SCDMA), WiMAX, LTE communication system, the communications apparatus, also known as a mobile station (MS) or user equipment (UE), may use discontinuous reception (DRX) during an idle mode to reduce power consumption after camping on a cell. In an idle mode, the communications apparatus 100 searches for or measures a Broadcast Control Channel (BCCH) which has the best signal quality from a base station provided by a specific network operator, or synchronized to the BCCH of a specific base station, ready to perform a random access procedure on the Random Access Channel (RACH) when requesting for a dedicated channel. In a dedicated mode, the communications apparatus 100 occupies a physical channel and tries to synchronize therewith.

Also, the communications apparatus 100 establishes logical channels and switches therebetween.

Figure 3:
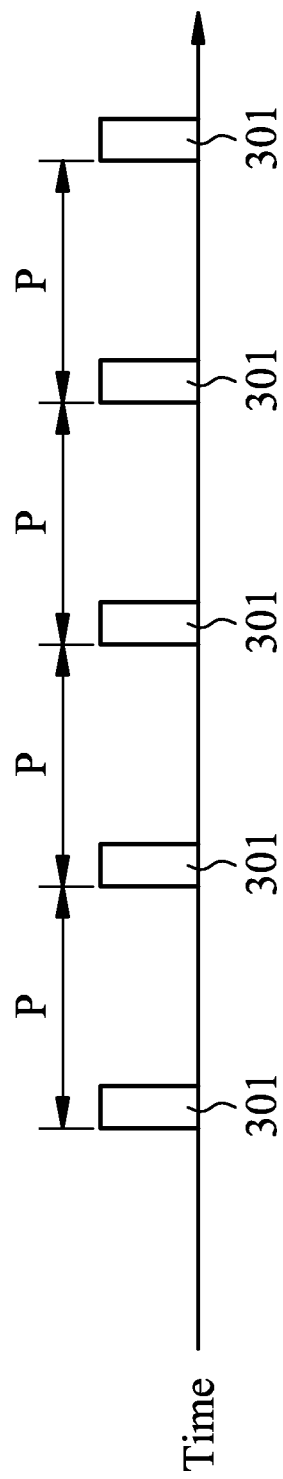
FIG. 3 shows an exemplary distribution of paging occasions and the corresponding paging periods along the time axis.

When a DRX is used, the base station or Node B (e.g. 201 of FIG. 2) may transmit paging messages or paging indicator messages periodically at paging occasions. Thus, the communications apparatus 100 is required to receive the paging messages carried in the paging channel (PCH) bursts at the paging occasions or the paging indicator messages carried in the paging indicator channel (PICH) bursts at the corresponding radio frames of the paging occasions. When the paging indicator corresponding to the communications apparatus 100 is received, the communications apparatus 100 is required to further receive the paging messages carried in the secondary common control physical channels (S-CCPCH) bursts. The communications apparatus 100 periodically monitors the PCH/S-CCPCH to avoid mobile terminated (MT) call lost, where the monitoring moments are referred to as paging occasions. The PICH is a common, time-shared indication channel used to inform the communications apparatus 100 whether a following PCH channel is required to be received. FIG. 3 shows an exemplary distribution of paging occasions 301 and the corresponding paging periods P along the time axis. As FIG. 3 shows, during the DRX cycle, each MS performing a power saving operation may wake up at its own paging occasions 301 to check up on paging messages. After receiving the paging message, the communications apparatus 100 my decide whether to sleep again by checking the Page Indicator (PI) in the paging message. If the paging indicator reveals that the communications apparatus 100 is now being paged, the communications apparatus 100 may initiate a procedure to receive an incoming call. Otherwise, the communications apparatus 100 may sleep again and wake up at a next paging occasion.

FIG. 4A shows a schematic diagram illustrating an exemplary distribution of paging occasions 410 at which a communications apparatus listens to and paging messages 420 broadcasted from a cell (e.g. 201 of FIG. 2) served by a first network operator that the communications apparatus has camped on. As shown in FIG. 4A, the communications apparatus monitors the PCH at every paging occasion 410, wherein a period of the paging occasions 410 is a predetermined time interval $T_D$. The predetermined time interval $T_D$ is determined according a plurality of multiframes, wherein each of the multiframes is formed consisting of 51 consecutive Time division multiple access (TDMA) frames. The cell served by the first network operator transmits paging messages at paging occasions when another device (e.g. mobile phone, telephone, or others) attempts to connect to the communications apparatus for subsequent data transceiving. As shown in FIG. 4A, the cell may send paging message 420 four times successively at the paging occasions $410_a$, $410_b$, $410_c$ and $410_d$ to page the communications apparatus to avoid paging message loss due to bad channel quality. FIG. 4B shows a schematic diagram illustrating another exemplary distribution of paging occasions 410 at which the communications apparatus listens to and paging messages 420 broadcasted from a cell served by a second network operator that the communications apparatus has camped on. As shown in FIG. 4B, the four paging messages 420 from the cell are broadcasted at the paging occasions $410_e$, $410_f$, $410_g$ and $410_h$ to page the communications apparatus. Compared to FIG. 4A, the cell served by the second network operator doubles the time interval to re-transmit the paging message 420 in FIG. 4B. For example, after broadcasting the paging message 420 at the paging occasion $410_e$, the cell broadcasts the paging message 420 at the paging occasion $410_f$. As shown in FIG. 4B, the cell served by the second network operator transmits the paging message 420 periodically according to a period substantially equal to two predetermined time intervals $T_D$.

Figure 5:
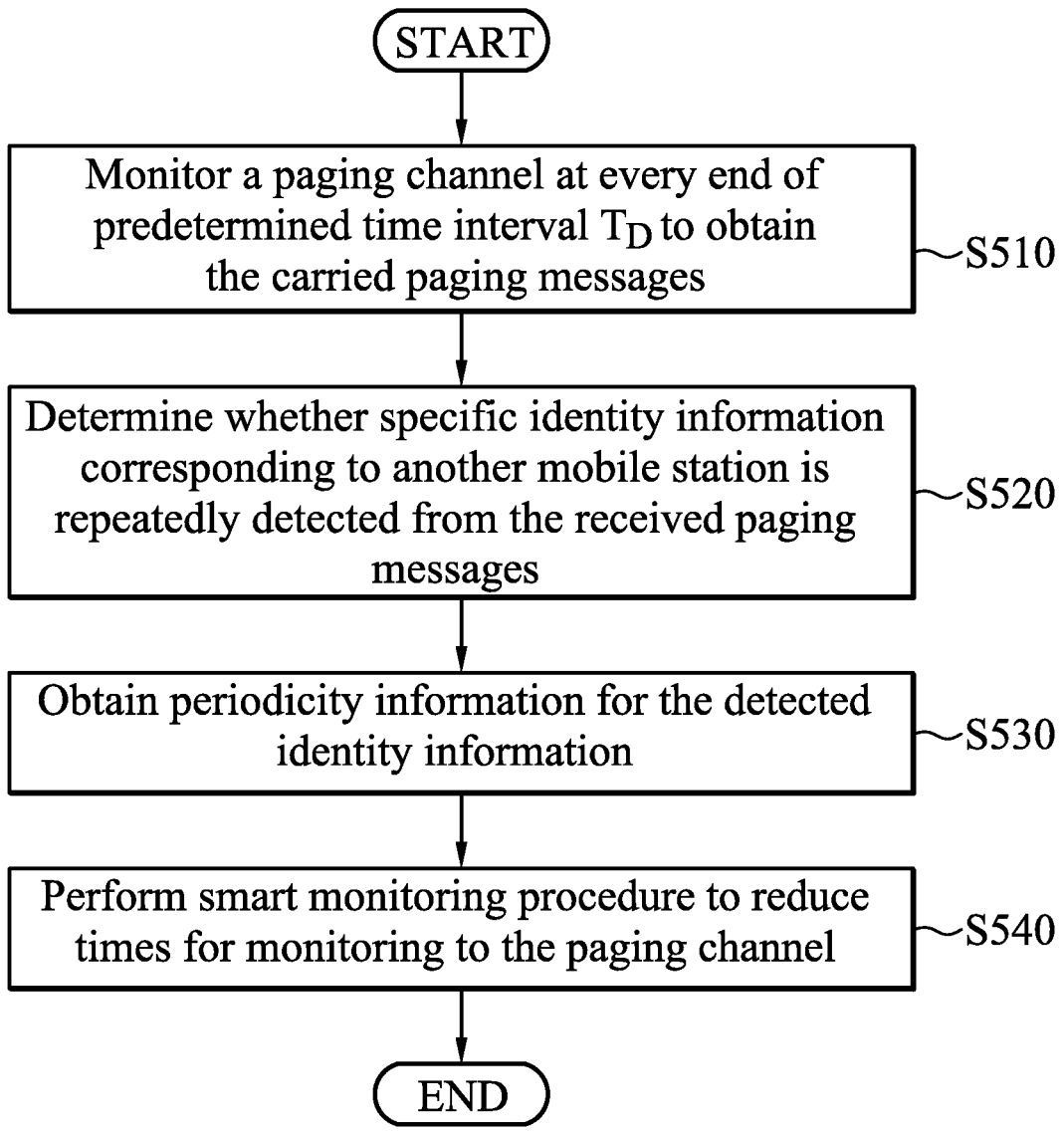
FIG. 5 shows a method for monitoring paging messages with reduced power consumption according to an embodiment of the invention.

FIG. 5 shows a method for monitoring paging messages with reduced power consumption according to an embodiment of the invention. The method is performed by a mobile station (e.g. 100 of FIGS. 1 and 2) with a subscriber identity card camping on a cell (e.g. 201 of FIG. 2). First, the mobile station monitors/listens to a paging channel (e.g. PCH or S-CCPCH) at every end of predetermined time interval $T_D$ subsequent to the last monitored time (step S510) to obtain the carried paging messages, wherein the mobile station receives the paging message via a radio transceiver module thereof (e.g. 104 of FIG. 1). Next, a baseband processing module of the mobile station (e.g. 103 of FIG. 1) determines whether specific identity information corresponding to another mobile station is repeatedly detected from the received paging messages (step S520). It is to be understood that delivering of a paging message through the paging channels more than one time can diminish the possibility of MT call lost. Next, periodicity information for the detected identity information is obtained (step S530). The periodicity information may indicate a time period between two successive paging messages containing the same identity information and a total number of the paging messages containing the same identity information. As an example, as shown in FIG. 4A, when the same identity information corresponding to a mobile station is carried by the paging messages 420 at paging occasions $410a$ to $410d$, the obtained time period is $T_D$ and the total number is four. As another example, as shown in FIG. 4B, the obtained time period is $2 \times T_D$ and the total number is four when the same identity information is carried by the paging messaging 420 at paging occasions $410e$ to $410h$. Next, the mobile station performs a smart monitoring procedure to reduce times for monitoring/listening to the paging channel or stay in the sleep mode at determined paging occasions to save battery power consumption (step S540). That is, the smart monitoring procedure listens to the paging channel less frequently than original configuration. For example, the mobile station wakes up to listen to the paging channel at every end of time interval $T_A$ subsequent to the last monitored time, where $T_A$ is longer than the predetermined time intervals $T_D$. In order to prevent paging message loss, the time interval $T_A$ does not exceed the obtained total number multiplying by the obtained time period between two successive paging messages. Furthermore, the method may also be implemented in other advanced communications systems, such as a Worldwide Interoperability for Microwave Access (WiMAX) system, a Long Term Evolution (LTE) system, a Time Division—Synchronous Code Division Multiple Access (TD-SCDMA) system, and so on.

General Packet Radio Service (GPRS) has been developed in GSM/WCDMA/TD-SCDMA networks. GPRS provides wireless access to packet data networks. Networks based on the Internet Protocol (IP) (e.g. the global Internet or private/corporate intranets) and X.25 networks are supported. Before a mobile station can use the GPRS service, the mobile station attaches to the GPRS network. An ATTACH REQUEST message of the mobile station is sent to a Serving GPRS Support Node (SGSN). The GPRS network then checks if the mobile station is authorized, copies the user profile from the Home Location Register (HLR) to the SGSN, and assigns a Packet Temporary Mobile Subscriber Identity (P-TMSI) to the mobile station. The described procedure is called GPRS Attach. To exchange data packets with external Public Data Networks (PDNs) after a successful GPRS Attach, the mobile station applies for an address used in the PDN. The address is called a Packet Data Protocol (PDP) address. In the case where the PDN is an IP network, the PDP address is an IP address. For each session, a so-called PDP context is created, which describes the characteristics of the session. The PDP context describes the PDP type (e.g. IPv4, IPv6 or others), the PDP address assigned to a mobile station, the requested Quality of Service (QoS) class and the address of a Gateway GPRS Support Node (GGSN) that serves as the access point to the external network. It is to be understood that, when camping on a GSM cell, the mobile station must stops transmitting and receiving data packets using the GPRS service for listening to a paging channel at each paging occasion. The smart monitoring procedure as shown in step S550 may be performed to reduce interruption of data transceiving, yielding a higher throughput rate.

Take simulated situations below as examples to illustrate the method of FIG. 5, FIG. 6A shows a schematic diagram illustrating an exemplary distribution of paging occasions at which the mobile station listens to and paging messages broadcasted from the cell that the mobile station has camped on. Before activating the smart monitoring procedure, the mobile station obtains periodicity information by listening to the PCH/S-CCPCH at the paging occasions $610_a$-$610_i$. In this situation, the mobile station detects the same identity information from four paging messages 620 at successive paging occasions and accordingly determines periodicity information indicating that a time period between two successive paging messages is $T_D$ and a total number of redundant paging messages is four. Thereafter, the mobile station performs a smart monitoring procedure to listen to the PCH/S-CCPCH at every end of time interval $T_A$ subsequent to the last monitored time, causing broadcasted paging messages to be obtained at the paging occasions $630_a$, $630b$, $630c$, $640d$, and $630_e$. The time interval $T_A$ is four times the length of the predetermined time interval $T_D$ (i.e. $4T_D$). The time period from the beginning to the paging occasion $610i$ shown in FIG. 6A may refer to as a training period for obtaining the time interval $T_A$ and accordingly determining whether to start the smart monitoring procedure.

FIG. 6B shows a schematic diagram illustrating another exemplary distribution of paging occasions at which the mobile station listens to and paging messages broadcasted from the cell that the mobile station has camped on. Before activating the smart monitoring procedure, the mobile station obtains periodicity information at the paging occasions $610_f$ and $610_h$, and recognizes a time period between two successive paging messages is $T_S=2\times T_D$, and a total number of redundant paging messages is two. Thereafter, the mobile station performs a smart monitoring procedure to listen to the PCH less frequently. Specifically, the mobile station monitors the PCH/S-CCPCH at every end of time interval $T_A$ subsequent to the last monitored time, causing broadcasted paging messages to be obtained at the paging occasions $630_a$, $630b$, $630c$, $640d$, and $630_e$. The time interval $T_A$ is four times the length of the predetermined $T_D$ (i.e. $4T_D$). The time period from the beginning to the paging occasion $610i$ shown in FIG. 6B may also refer to as a training period.

Figure 7:
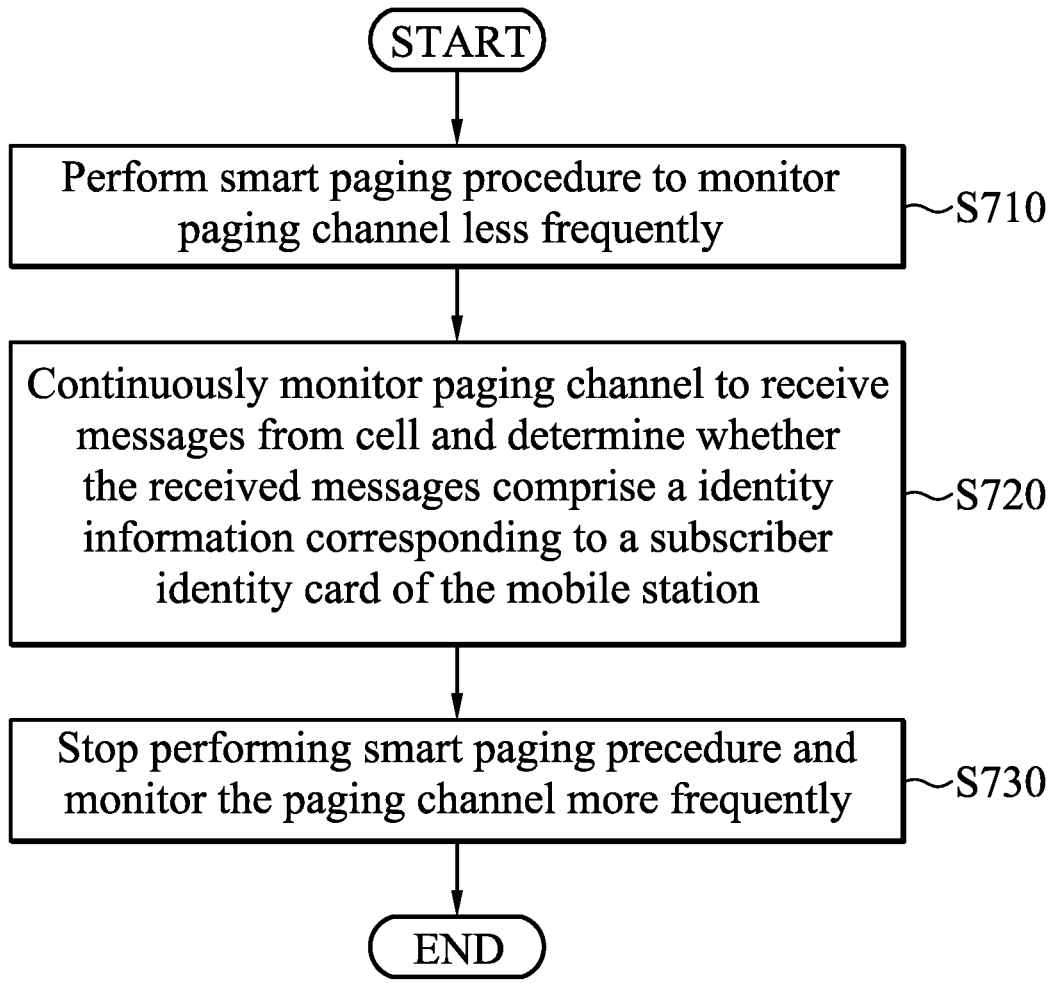
FIG. 7 shows a method for monitoring paging messages with reduced power consumption according to another embodiment of the invention.

FIG. 7 shows a method for monitoring paging messages with reduced power consumption according to an embodiment of the invention. The method is performed by a mobile station (e.g. 100 of FIGS. 1 and 2) with a subscriber identity card camped on a cell (e.g. 201 of FIG. 2). First, the mobile station performs a smart monitoring procedure to monitor/listen to a paging channel less frequently (step S710). As described above, when the smart monitoring procedure is performed, the mobile station monitors the paging channel at every end of time interval $T_A$ subsequent to the last monitored time, where the time interval $T_A$ is a period longer than the predetermined time interval $T_D$. Next, the mobile station continuously monitors the paging channel to receive the broadcasted messages from the cell and determines whether the received messages comprise identity information corresponding to the equipped subscriber identity card of the mobile station until a specific condition is satisfied (step S720). The specific condition indicates that the broadcasted message carried by the paging channel may be interfered due to bad quality of the air interface. Next, when determining that the specific condition is satisfied, the mobile station stops performing the smart monitoring procedure (step S730), i.e. the paging channel is monitored at every end of predetermined time interval $T_D$ subsequent to the last monitored time.

In an embodiment, the specific condition is determined according to an air interface condition between the mobile station and the cell. For example, a downlink signaling failure counter (DSC) or the received signal strength is used to estimate the air interface condition between the mobile station and the cell. The DSC is a counter which is increased by 1 when the received message is successfully decoded by the mobile station, otherwise is decreased by 4. When the DSC indicates that the downlink signaling failure status is seriously interfered, such as the DSC is lower than a predefined value, the mobile station disables the smart monitoring procedure. In addition, the signal strength received from the broadcast control channel (BCCH) is referred to as Received Signal Level (RXLEX) which is a parameter for describing the quality of a channel measured in dBm. When the measured quality of the channel is worse than an acceptable level, such as the RXLEX is lower than a predefined value, the mobile station disables the smart monitoring procedure. Furthermore, the received signal to noise ratio $E_c/N_0$ (signal energy to noise power spectral density ratio) and received signal code power (RSCP) of primary synchronization code (PSC) in the Common Pilot Channel (CPICH) may be used to measure the quality of a channel. For example, when the RSCP is lower than −90 dBm or the received signal to noise ratio $E_c/N_0$ is lower than −15 dBM, the radio link quality is regarded as poor. When the measured channel quality is poor, the mobile station disables the smart monitoring procedure.

In an embodiment, the specific condition is determined according to a quantity of mobile stations camped on the cell. In general, when the quantity of the paged mobile stations is increased, the cell may not repeatedly send the same identity information for tolerating bad air interface. For example, when the mobile station detects a paging message and discovers two International Mobile Subscriber Identity (IMSI), three Temporary Mobile Subscriber Identity (TMSI), or one IMSI with one TMSI, or more, the mobile station disables the smart monitoring procedure. Furthermore, in an embodiment, the specific condition is determined according to a message type of the received message or an operational state of the mobile station. For example, when the received message is not a paging message, the mobile station disables the smart monitoring procedure. If the received message is a paging message, a paging type of the paging message is further detected. The mobile station disables the smart monitoring procedure when the received paging message is not a normal paging, such as an extended paging or a reorganization paging. On top of that, when the operational state of the mobile station indicates that a cell reselection procedure is being performed, the mobile station also disables the smart monitoring procedure.

Figure 8:
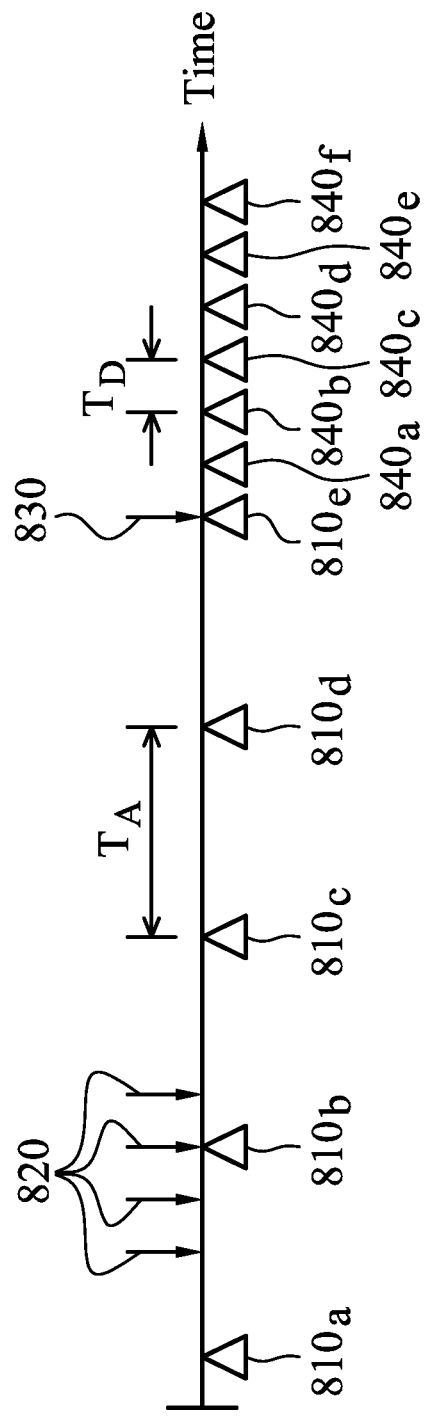

FIG. 8 shows a schematic diagram illustrating an exemplary distribution of paging occasions of the mobile station at which the mobile station listens to and paging messages broadcasted from the cell that the mobile station has camped on. First, the mobile station performs a smart monitoring procedure to monitor the PCH/S-CCPCH at every end of predetermined time interval $T_A$ subsequent to the last monitored time, causing broadcasted paging messages to be obtained at the paging occasions $810_a$, $810_b$, $810_c$, $810_d$ and $810_e$. For example, if the cell sends the paging message 820 four times to prevent message distortion, and the mobile station may receive the paging message 820 at paging occasion $810_e$. Thus, the mobile station does not miss the paging message. Next, at paging occasion $810_e$, the mobile station detects at least one of the above specific conditions. Thus, the mobile station stops performing the smart monitoring procedure and then monitors the PCH at every end of time interval $T_D$ subsequent to the last monitored time, such as the paging occasions $840_a$, $840_b$, $840_c$, $840_d$, $840_e$ and $840_f$, until a next smart monitoring procedure is performed.

Figure 9:
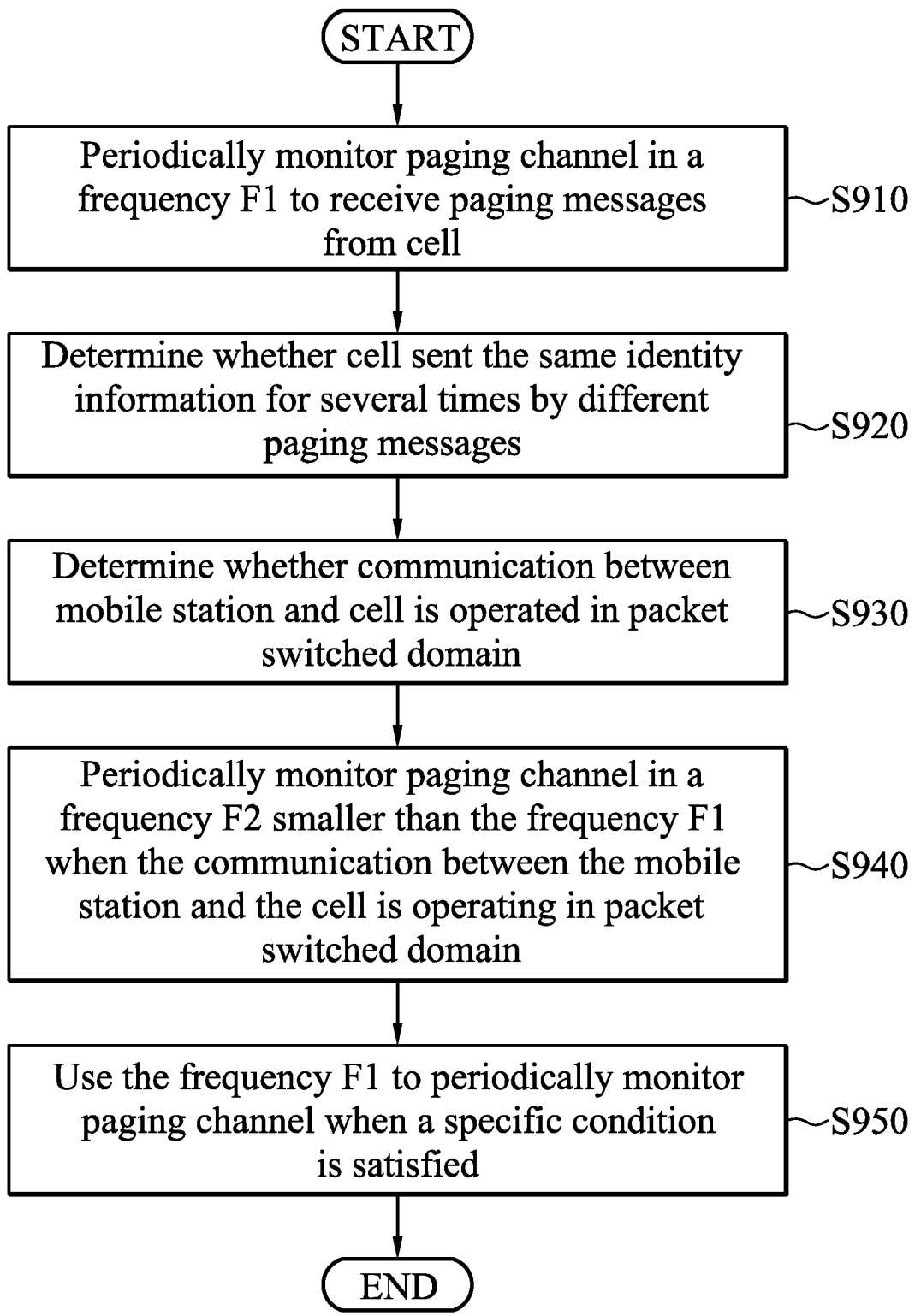
FIG. 9 shows a method for monitoring paging messages with reduced power consumption according to another embodiment of the invention.

FIG. 9 shows a method for monitoring paging messages with reduced power consumption according to an embodiment of the invention. The method is performed by a mobile station (e.g. 100 of FIGS. 1 and 2) with a subscriber identity card camping on a cell (e.g. 201 of FIG. 2). First, the mobile station periodically monitors a paging channel in a frequency F1 to receive paging messages from the cell (step S910), wherein the frequency F1 may be obtained according to the predetermined time interval $T_D$ of FIG. 6A (e.g. F1=1/$T_D$). Next, the mobile station determines whether the cell sent the same identity information for several times by different paging messages (step S920). Next, the mobile station determines whether communication between the mobile station and the cell is operating in a packet switched domain (step S930), that is, a PDP context has been successfully established. Next, the mobile station uses a frequency F2 lower than the frequency F1 to periodically monitor the paging channel when determining that the communication between the mobile station and the cell is operating in a packet switched domain (step S940). Thus, interruption for data packet transceiving is reduced, resulting in improved throughput. Similarly, the frequency F2 may be obtained according to the predetermined time interval $T_A$ of FIG. 6A (e.g. F2=1/$T_A$). The frequency F1 is a multiple of the frequency F2 as the time interval $T_A$ is a multiple of the predetermined time interval $T_D$. Next, the mobile station uses the frequency F1 to periodically monitor the paging channel when a specific condition is satisfied (step S950). As described above, the specific condition is determined according to an air interface condition between the mobile station and the cell, a quantity of mobile stations camped on the cell, a message type of the received message or an operational state of the mobile station.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for monitoring paging messages in a mobile station with a subscriber identity card camping on a cell, comprising:
   monitoring a paging channel from the cell at every end of a first time interval subsequent to the last monitored time;
   detecting whether a same identity information is repeatedly broadcasted in the paging channel at different ends of the first time interval;
   determining a total number of periodically repeated paging messages containing the same identity information;
   determining a second time interval by multiplying a time period between two successive repeated paging messages with the total number of periodically repeated paging messages, wherein the time period equals to a multiple of the first time interval;
   performing a smart monitoring procedure to monitor a paging channel at every end of second time interval subsequent to the last monitored time so as to receive a paging message; and
   stopping performing the smart monitoring procedure when a specific condition is satisfied, so as to monitor the paging channel at every end of first time interval subsequent to the last monitored time to receive subsequent messages, wherein the second time interval is longer than the first time interval.

2. The method as claimed in claim 1, wherein the step of performing the smart monitoring procedure further comprises:
   determining whether the received paging message comprises identity information corresponding to the subscriber identity card of the mobile station in the monitored paging channel.

3. A communication apparatus for monitoring paging messages, comprising:
   a transceiver;
   a processing module monitoring a paging channel from a cell at every end of a first time interval subsequent to the last monitored time; detecting whether a same identity information is repeatedly broadcasted in the paging channel at different ends of the first time interval; determining a total number of periodically repeated paging messages containing the same identity information; determining a second time interval by multiplying a time period between two successive repeated paging messages with the total number of periodically repeated paging messages, wherein the time period equals to a multiple of the first time interval; and monitoring the paging channel at every end of the second time interval subsequent to the last monitored time so as to receive subsequent paging messages from the cell.

4. The communication apparatus as claimed in claim 3, wherein the processing module further determines whether the paging message comprises identity information corresponding to the subscriber identity card of the mobile station in the monitored paging channel.

5. A method for monitoring paging messages in a mobile station with a subscriber identity card camping on a cell, comprising:
   monitoring a paging channel from the cell at every end of a first time interval subsequent to the last monitored time;
   detecting whether a same identity information is repeatedly broadcasted in the paging channel at different ends of the first time interval;
   determining a total number of periodically repeated paging messages containing the same identity information;
   determining a second time interval by multiplying a time period between two successive repeated paging messages with the total number of periodically repeated paging messages, wherein the time period equals to a multiple of the first time interval; and monitoring the paging channel at every end of the second time interval subsequent to the last monitored time so as to receive subsequent paging messages from the cell.

6. The method as claimed in claim 5, wherein the method further comprises:

stopping monitoring the paging channel at every end of the second time interval when a specific condition is satisfied, so as to monitor the paging channel at every end of first time interval subsequent to the last monitored time to receive subsequent messages.

7. The method as claimed in claim 6, wherein the specific condition is determined according to an air interface condition between the mobile station and the cell.

8. The method as claimed in claim 6, wherein when the received message is not a paging message or a normal paging, or when a cell reselection procedure is performed, the specific condition is satisfied.

9. The method as claimed in claim 5, wherein the second time interval is a multiple of the first time interval.

* * * * *